United States Patent [19]

Kirkpatrick

[11] 4,150,386

[45] Apr. 17, 1979

[54] APPARATUS FOR DISPENSING AND ADVANCING THE RECORDING OR PLOTTING MEDIUM FOR A STRIP CHART TYPE UTILIZATION DEVICE

[75] Inventor: Burnard M. Kirkpatrick, Dallas, Tex.

[73] Assignee: Gearhart-Owen Industries, Inc., Fort Worth, Tex.

[21] Appl. No.: 805,650

[22] Filed: Jun. 13, 1977

[51] Int. Cl.² .............................................. G01D 15/28
[52] U.S. Cl. ................................. 346/136; 242/75.43
[58] Field of Search ........... 346/136; 242/75.4, 75.43, 242/156.2; 226/195

[56] References Cited

U.S. PATENT DOCUMENTS

| | | | |
|---|---|---|---|
| 1,469,284 | 10/1923 | Strawn | 242/75.43 |
| 2,524,564 | 10/1950 | Gorham | 346/136 |
| 3,069,107 | 12/1962 | Hirt | 242/75.43 X |
| 3,357,347 | 12/1967 | Nesin | 242/75.43 X |

*Primary Examiner*—Joseph W. Hartary
*Attorney, Agent, or Firm*—Wm. T. Wofford

[57] ABSTRACT

Apparatus is provided for achieving true and accurate feed of linear sheet material such as a recording or plotting medium in a strip chart type utilization device, particularly in applications where a high degree of feed accuracy is required.

3 Claims, 6 Drawing Figures

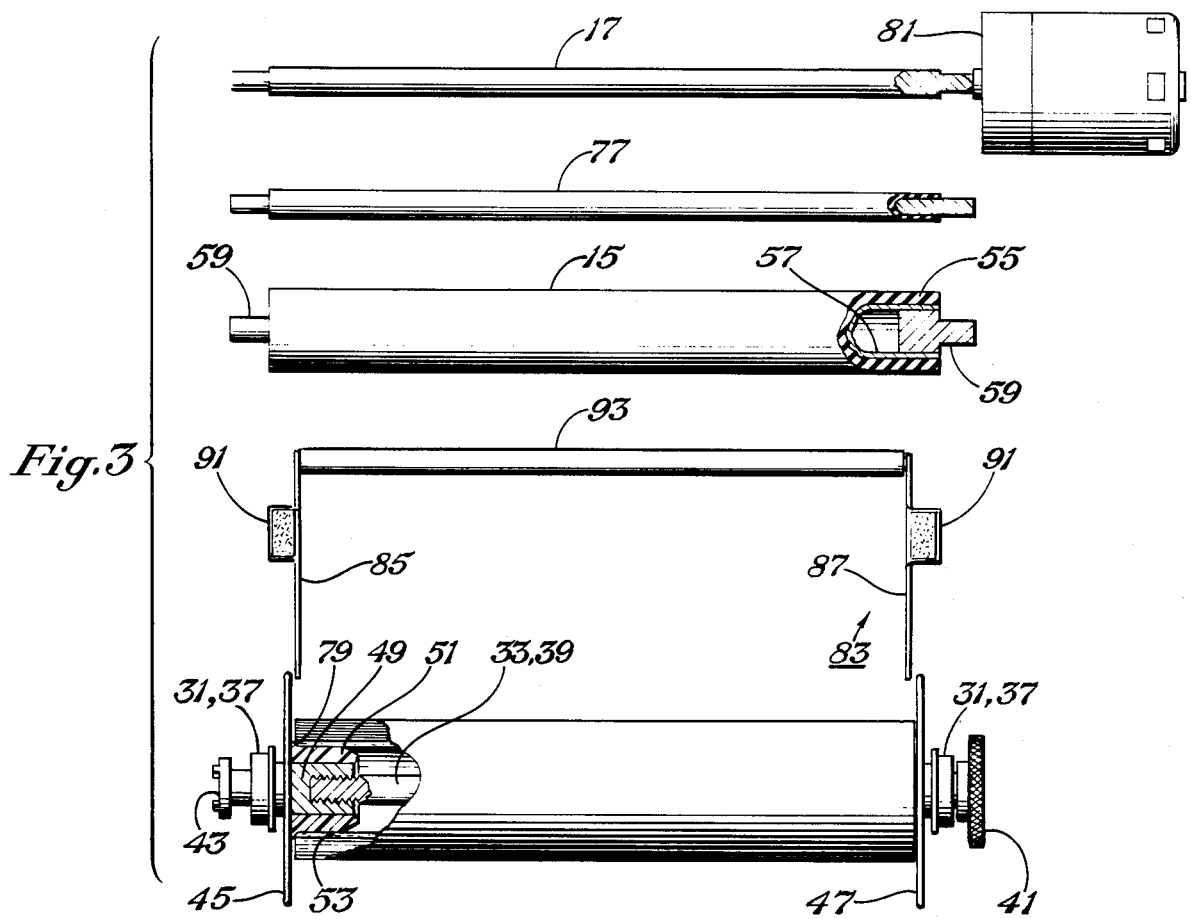
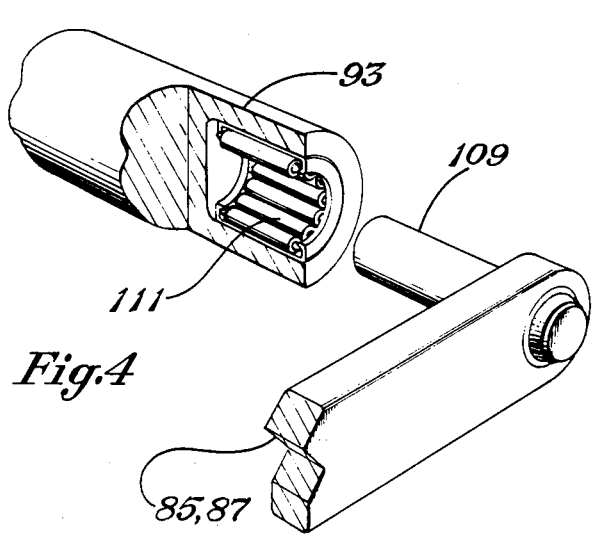
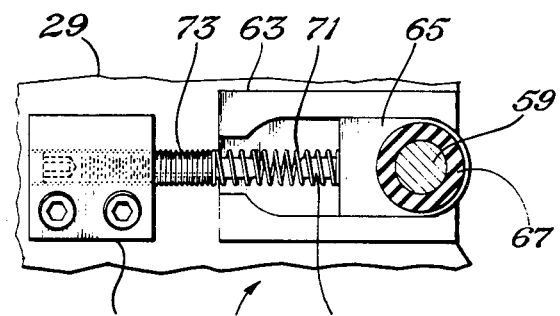
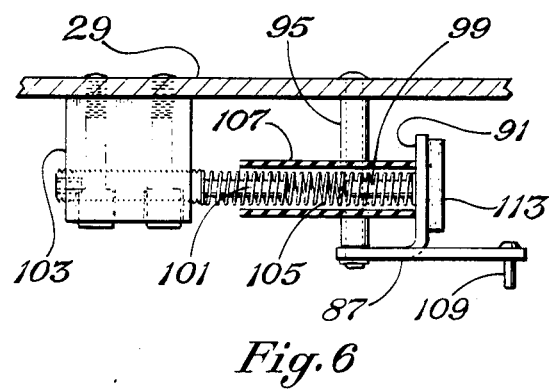

APPARATUS FOR DISPENSING AND ADVANCING THE RECORDING OR PLOTTING MEDIUM FOR A STRIP CHART TYPE UTILIZATION DEVICE

FIELD OF THE INVENTION

This invention relates to apparatus for dispensing and advancing a linear sheet material such as the recording or plotting medium for example for a strip chart type utilization device and more particularly to such apparatus incorporating mechanism for achieving a true and accurate feed of the recording medium.

BACKGROUND OF THE INVENTION

There are numerous applications wherein a web or sheet of material is fed from a supply roll or drum to some utilization device. Also, there have been many provisions for keeping the web or sheet suitably aligned so that it does not foul.

In some applications, however, these prior art provisions have proved to be inadequate. One such application involves the feeding of a plotting or recording medium in web or sheet form from a supply drum to the recording mechanism of a digital plotter. In this application, true and accurate feeding of the recording medium is essential to the obtaining of satisfactory results.

It is the general object of this invention to provide improved apparatus for the dispensing and feeding of a web or sheet of material such as, for example, a recording or plotting medium from a supply roll or drum to a utilization device so as to obtain a satisfactory result from the standpoints of true and accurate feed, particularly in applications where a high degree of feed accuracy is required.

BRIEF DESCRIPTION OF THE DRAWINGS

FIG. 3 is a schematic exploded front elevational view of parts of the recording medium dispensing and feeding apparatus of FIG. 2.

FIG. 4 is a detailed exploded perspective view, partly in section, showing the slack detector roller bearing support structure.

FIG. 5 is a detailed side elevation view, partly in section, showing the spring biased sleeve bearing structure for the pressure roller.

FIG. 6 is a detailed plan view, partly in section, showing the spring bias arrangement for the braking levers.

DESCRIPTION OF THE PREFERRED EMBODIMENT

Figure 1:
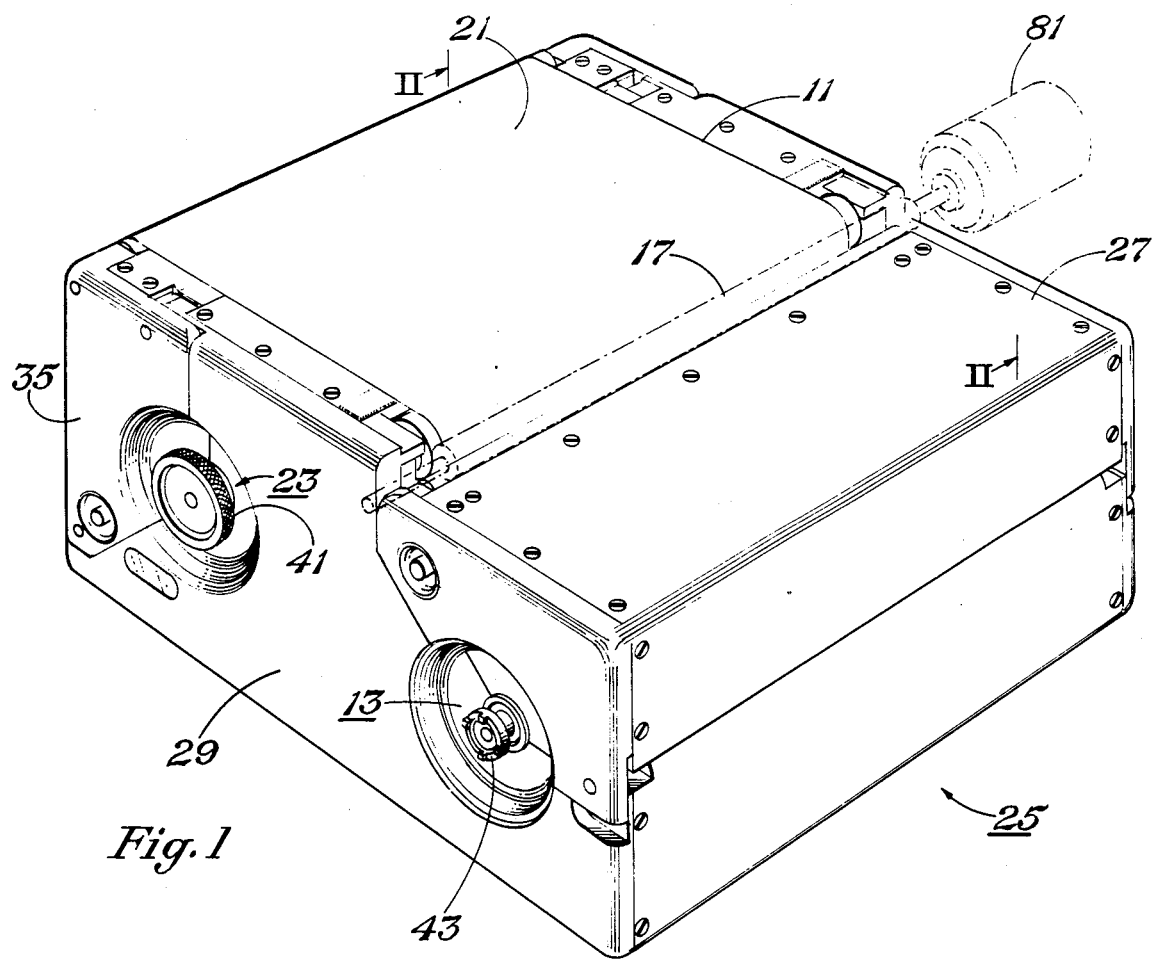
FIG. 1 is a schematic perspective view showing a recording medium dispensing and feeding apparatus in accordance with a preferred embodiment of the invention.

As can be seen in the drawings, a recording medium 11 in web or sheet form is fed from a supply drum 13 upwardly between a pressure roller 15 and a powered capstan 17, past a recorder scanning beam 19, over a viewing surface 21 and to a take-up storage drum 23. Since, in the embodiment shown, the invention is applied to a digital plotter in which a scanning recorder beam exposes a light sensitive medium which may be film, there is provided a light-proof housing 25 which serves as a frame to support various components of the apparatus. The housing 25 is provided with a first hinged closure 27 which, when opened, permits the insertion or extraction of the supply drum 13, and when closed, provides in cooperation with portions of the housing side walls 29, bearing supports for the bearings 31 on which the supply drum is journaled. The housing 25 is also provided with a second hinged closure 35 which, when opened, permits the insertion or extraction of the storage drum 23, and when closed, provides in cooperation with portions of the housing side walls 29, bearing supports for the bearings 37 on which the storage drum is journaled.

The supply drum 13 and the storage drum 23 are actually identical and, as best shown by FIG. 3, comprise stub shafts 49 which carry the bearings 31, 37 and which are internally threaded at their inner ends to receive a main shaft 33, 39. A hub 51 having an integral flange is molded onto each stub shaft 49. These integral flanges are for convenience designated as a left drum flange 45 and a right drum flange 47. The recording medium 11 is wound on a core 53 which is supported and aligned by the hubs 51 and is clamped by the flanges 45, 47 as the main shaft 33, 39 is threaded onto the stub shafts 49. Gussets 79 are formed on at least one of the hubs 51 to engage the core 53 as it is clamped, to accommodate minor variations in core length and to assure that the core will not rotate relative to the hubs. The main shaft is preferably fixed to one of the stub shafts so as to always thread on and off the same stub shaft. The recording medium width is slightly less than the length of the core 53 so as to provide some side clearance between the recording medium 11 and the flanges 45, 47. The torque drive fitting 43 is only utilized when a drum is being used as a storage drum, in which case it is engaged by a conventional torque motor (not shown) which acts to supply only the force necessary to wind the recording medium onto the storage drum as it is fed past the recorder beam.

The pressure roller 15 has a rubber sheath 55 bonded to a metal core 57, with stub bearing shafts 59 inserted and fixed at the end portions of the metal core. The pressure roller stub shafts 59 are journaled in spring biased sleeve bearing structures 61 as best shown by FIG. 5. Each such bearing structures 61 has a guideway 63 which is fixed to a respective housing side wall 29 and in which there is mounted a reciprocable slide 65 which carries the sleeve bearing 67 in which a respective stub bearing shaft 59 is journaled. The slide 65 has an axial boss 69 which receives one end of a bias spring 71 the other end of which is received by an adjustable boss 73 which is carried by support block 75 which is fixed to a respective housing side wall 29. The powered capstan 17 is a metal rod which is journaled on suitable bearings carried by the frame structure of the digital plotter (not shown) and is powered by a stepping motor 81 which is also carried by the digital plotter frame structure.

A light seal roller 77 is journaled in the housing first hinged closure 27 so as to be contacted along its length by the pressure roller 15 when the housing 25 is not latched in place on the digital plotter (not shown), thus providing a light seal. When the housing is latched in its operational position on the digital plotter, the pressure roll is contacted by the powered capstan, causing the reciprocable slides 65 to be moved slightly rearwardly so as to move the pressure roller 15 out of contact with the light seal roller 77.

The spring biased sleeve bearing structure 61 which carries the pressure roller 15, causes the pressure roller to exert a pressure against the powered capstan 17 so as to suitably "pinch" the recording medium 11 to obtain a proper drive. This pressure is adjustable by rotation of the threaded adjustable boss 73 to obtain desired compression of the bias springs 71. Further, the spring biased sleeve bearing structures 61 support the pressure roller 15 in a manner to permit the pressure roller 15 to have a floating action which tends to keep the pressure roller in alignment with the powered capstan.

Figure 2:
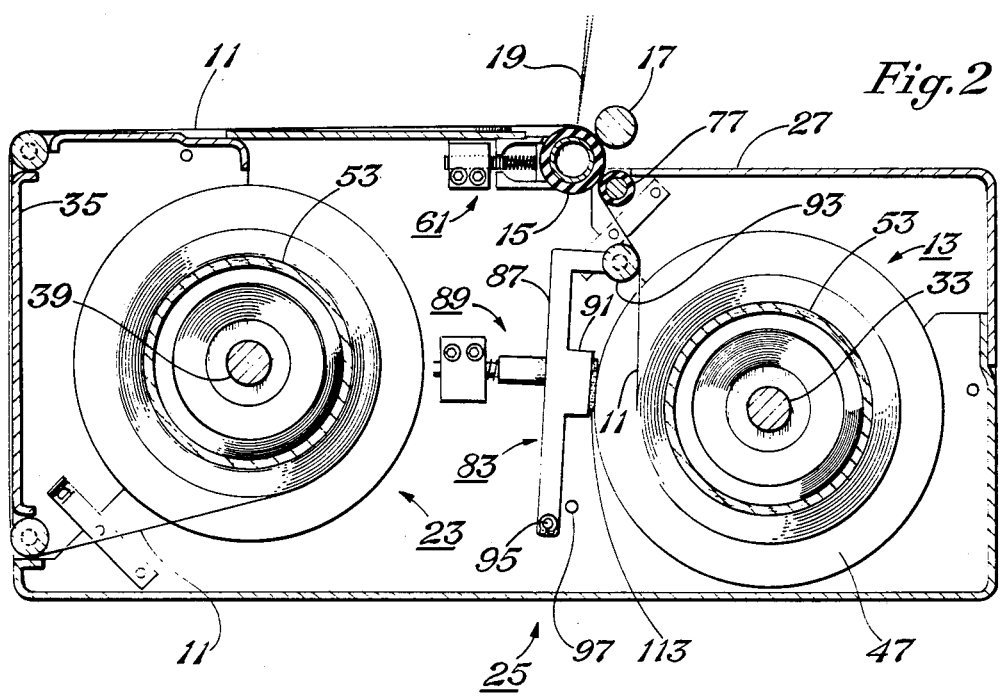
FIG. 2 is a section view, taken at lines 2—2 of FIG. 1.

A recording medium slack detector and braking assembly 83, as best shown by FIGS. 2 and 3, comprises a left and a right braking lever 85, 87, an adjustable biasing means 89 for each lever, a braking shoe 91 for each lever, and a slack detector roller 93.

Each braking lever 85, 87 is an arm having the general shape of the letter F and is pivotally fixed at its lower end to a pivot pin 95 which extends inwardly from a respective housing sidewall 29 a sufficient distance to enable the braking shoe 91 to engage the respective drum flange 45, 47. A stop pin 97 extends inwardly from the respective housing sidewall and serves to limit rotational movement of the respective braking lever in the supply drum direction when the supply drum 13 is removed from the housing.

The adjustable biasing means 89, for each lever 85, 87, as best shown in FIG. 6, comprises a boss 99 which is fixed to the back side of the brake shoe 91 and extends rearwardly therefrom so as to be generally coaxial with an adjustable boss 101 which is carried by a support block 103 which is fixed to a respective housing sidewall 29. The boss 99 receives one end of a bias spring 105 the other end of which is received by the adjustable boss 101. A plastic sleeve 107 surrounds the bias spring 105 so as to keep it in proper alignment.

The resepective braking lever 85, 87, at its upper and outer end portion, carries a respective inwardly extending bearing pin 109 upon which the slack detector roller 93 (see FIG. 4) is journaled. The slack detector roller is a metal cylinder which carries a respective roller type bearing 111 at each of its end portions. The bearing-journal structure is such as to permit a limited universal or gimbal-like movement of the pin 109 in the bearing 111, for a purpose to be hereinafter explained. Each brake shoe 91 carries a friction pad 113 of suitable material, which may, for example, be rubberized cork.

The operation of the apparatus of the invention will be better understood with the aid of some preliminary observations. If the structure described herein, without the recording medium slack detector and braking assembly 83, could be manufactured and assembled in an idealized manner and remain so, then the recording medium could be expected to be fed true and without deviation from the supply drum along its path and to the storage drum. Such idealized situation would require and assume, however, that the recording medium has been accurately slit so that the strip or roll has no edge curvature along its length; that the axes of rotation of the supply drum and the powered capstan and the pressure roller are, in fact, parallel; that the diameters of the various rolls or cylindrical elements are, in fact, constant along their lengths; that there is no deflection of the axes of the powered capstan and pressure roller; and the like. Unfortunately, such idealized conditions do not exist and in actual practice the recording medium being drawn from the supply drum by the pressure roller-powered capstan can be expected to drift off to one side or the other. If not prevented or contained, such drift can continue until the recording medium edge contacts the housing sidewalls 29 and becomes crumpled, torn, or otherwise damaged.

The present invention deals with the question of how best to solve the problem of recording medium drift in those applications, such as the digital plotter, where there is a requirement that the recording medium feed be not only true, but also accurate. The pressure needed between the powered capstan and the pressure roller in order to advance the recording medium without slippage can result in some distortion of the powered capstan. This is particularly true when the powered capstan is driven in discrete increments by a stepping motor which has high acceleration and deceleration. In a typical case, the capstan may have a 0.3174 inch diameter, which is the diameter required to advance a recording medium 0.005 inch using a 1.8° per step stepping motor. Such capstan may have a 10 inch unsupported length, with the recording medium being typically 8.875 inches wide. If the capstan is backed up at its center by a bearing assembly, the capstan distortion may be somewhat reduced, but not eliminated.

Another important consideration is that the tension on the recording medium being fed to the capstan-pressure roller be minimal, such that no slippage of the recording medium occurs due to such tension.

A distinction must be made between skew and lateral displacement of the recording medium. Skew is the angular displacement of the recording medium from the desired direction of travel and results in slack occuring at the edge of the recording medium nearest the direction of skew. Lateral recording medium displacement is a rectilinear displacement of the recording medium to one side or the other and evidenced by the occurrence of slack at the edge of the recording medium opposite to the direction of displacement. It is the lateral recording medium displacement that the apparatus of the present invention is designed to control.

Keeping in mind the conditions and considerations hereinabove outlined, and realizing that the pressure exerted by the capstan-pressure roller on the recording medium at a given instant will not be uniform along the contact area length, and realizing that the region of greatest pressure may migrate along the contact area length as the recording medium feed progresses, and further realizing that the recording medium will tend to move laterally toward the region of greatest pressure; it may become apparent that the recording medium as it is being advanced or fed, actually is in a state which may be termed "unstable equilibrium". In other words, so long as the integral of the pressure on the recording medium on one side of the pressure roller center is equal to that on the other side, the recording medium will remain true; but if the integral of the pressure on one side exceeds that on the other side then the recording medium will tend to migrate laterally toward the side of greatest pressure. Thus, if not controlled, the recording medium will tend to move laterally toward one side or the other or may tend to oscillate from side to side as a function of pressure integrals, and may from time to time move to one side or the other far enough to cause fouling and damage to the recording medium.

In accordance with the present invention, there is provided means for maintaining a pressure roller in floating contact with a powered capstan; means for adjusting the pressure applied by the pressure roller to the powered capstan such that a recording medium can be advanced, even on an incremental basis by a stepping motor drive, without slippage, but also such that slippage can be accomplished as desired by a braking or retarding means; an adjustable braking or retarding means for a recording medium supply drum, such that desired minimal tension can be applied to the recording medium; and slack detector and braking means which can independently detect slack occurring in the region of either edge of the recording medium and immediately apply braking effort to the recording medium supply drum which is a function of the degree of slack occurring, with such breaking effort causing slippage on the side opposite the slack until the slack condition is corrected.

In the embodiment shown, the pressure roller 15 is maintained in floating contact with the powered capstan 17 by the spring biased sleeve bearing structure 61. The pressure applied by the pressure roller is adjusted by movement of the adjustable boss 73 to control the compression of the bias spring 71. An adjustable braking or retarding means for the recording medium supply drum 13 is provided by the respective adjustable biasing means 89 acting on the brake shoe 91 and its friction pad 113 which bears on a respective drum flange 45, 47. The slack detector and braking means comprises the left and right braking lever 85, 87; their adjustable bias means 89, and the slack detector roller 93.

In the practice of the invention, in the embodiments shown, the pressure roller 15 is adjusted such that the pressure roller-capstan pressure on the recording medium 11 is sufficient but does not significantly exceed that required to advance the recording medium normally without slippage. The adjustable biasing means 89 is adjusted such that the friction pads 113 will provide a normal retarding force on the supply drum 13 so that the recording medium 11 will have no slack but will have minimal tension. The slack detector roller 93 will be in contact with the recording medium 11. If, as it is being normally advanced, the recording medium 11 drifts slightly toward one side, for example, the right side, then a small amount of slack will occur at the left side, which slack is immediately detected by the slack detector roller 93 which will tend to move slightly toward the supply drum 13, causing the left braking lever 85 to apply braking force to the supply drum left flange 45 such that the recording medium tension at the right side is momentarily increased enough to cause slippage at the right side of the capstan-pressure roller until the slack at the left side of the recording medium 11 has disappeared. It is important to understand that the slack detection and corrective action takes place rapidly and in small increments, so that the recording medium slippage required does not appreciably affect the accuracy of advance of the recording medium. It should also be understood that the universal or gimbal-like movement of the slack detector roller on its bearing supports 109, 111 permits independent slack detection action for slack appearing at either edge of the recording medium 11.

The foregoing disclosure and the showings made in the drawings are merely illustrative of the principles of this invention and are not to be interpreted in a limiting sense.

What is claimed is:

1. Apparatus for dispensing and advancing a web or sheet medium for a utilization device, comprising:
   a. a supply drum for carrying the medium to be dispensed;
   b. bearing and support means journalling said supply drum for free rotation about its longitudinal axis;
   c. a pressure roller and a powered capstan, with means for maintaining said pressure roller in floating contact with said powered capstan;
   d. means for adjusting the pressure applied by said pressure roller to said powered capstan;
   e. an adjustable retarding means for said supply drum;
   f. means for independently detecting slack occurring in the region of either edge of said medium and immediately applying braking effort to said supply drum which braking effort is a function of the degree of slack occurring.

2. Apparatus for dispensing and advancing the recording or plotting medium for a strip chart type utilization device, comprising:
   a. a supply drum for carrying the medium to be dispensed;
   b. bearing and support means journalling said supply drum for free rotation about its longitudinal axis;
   c. a pressure roller and a powered capstan, with means for maintaining said pressure roller in floating contact with said powered capstan;
   d. means for adjusting the pressure applied by said pressure roller to said powered capstan;
   e. an adjustable retarding means for said supply drum;
   f. means for independently detecting slack occurring in the region of either edge of said recording or plotting medium and immediately applying braking effort to said supply drum which braking effort is a function of the degree of slack occurring.

3. Apparatus for dispensing and advancing the recording or plotting medium for a strip chart type utilization device, comprising;
   a. a supply drum for carrying the medium to be dispensed;
   b. bearing and support means journalling said supply drum for free rotation about its longitudinal axis;
   c. a left and a right drum flange fixed to rotate with said drum;
   d. a pressure roller and a powered capstan, with means for maintaining said pressure roller in floating contact with said powered capstan;
   e. means for adjusting the pressure applied by said pressure roller to said powered capstan;
   f. left and right braking levers each having a friction pad for engaging a respective drum flange, and adjustable spring bias means urging said respective pads against said flanges;
   g. a recording or plotting medium slack detector roller journalled at its end portions to said respective braking levers for limited universal or gimbal-like movement.

* * * * *